Oct. 11, 1927.  1,645,404
H. T. RINGROSE
DETECTING, INDICATING, AND RECORDING THE PRESENCE OF
INFLAMMABLE VAPORS OR GASES
Filed April 6, 1927   5 Sheets-Sheet 1

Inventor
Henry T. Ringrose
By J. H. McCrady
his attorney

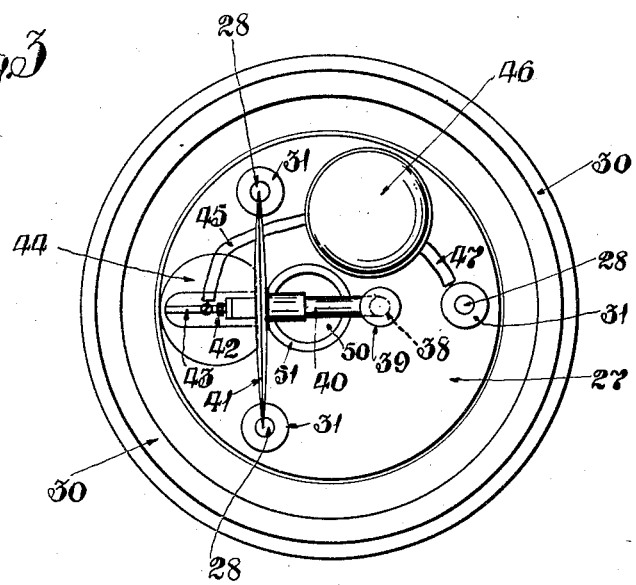
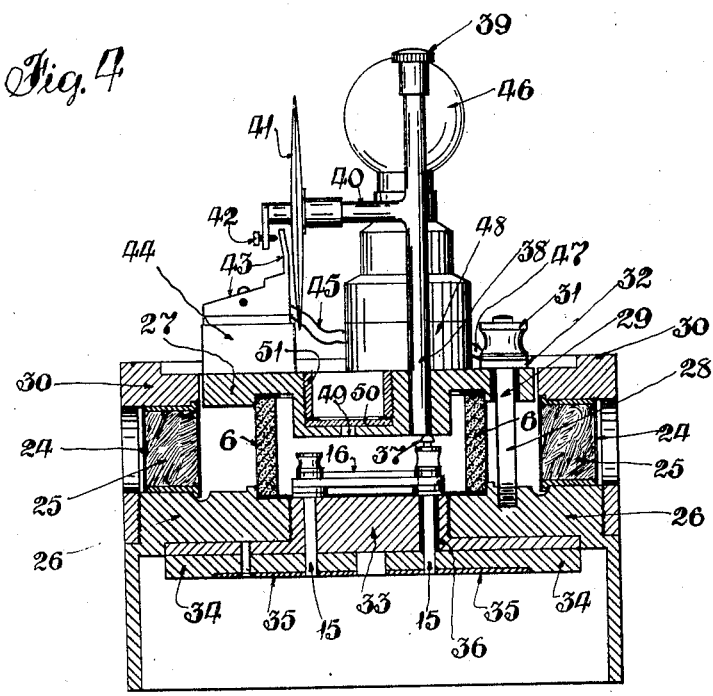

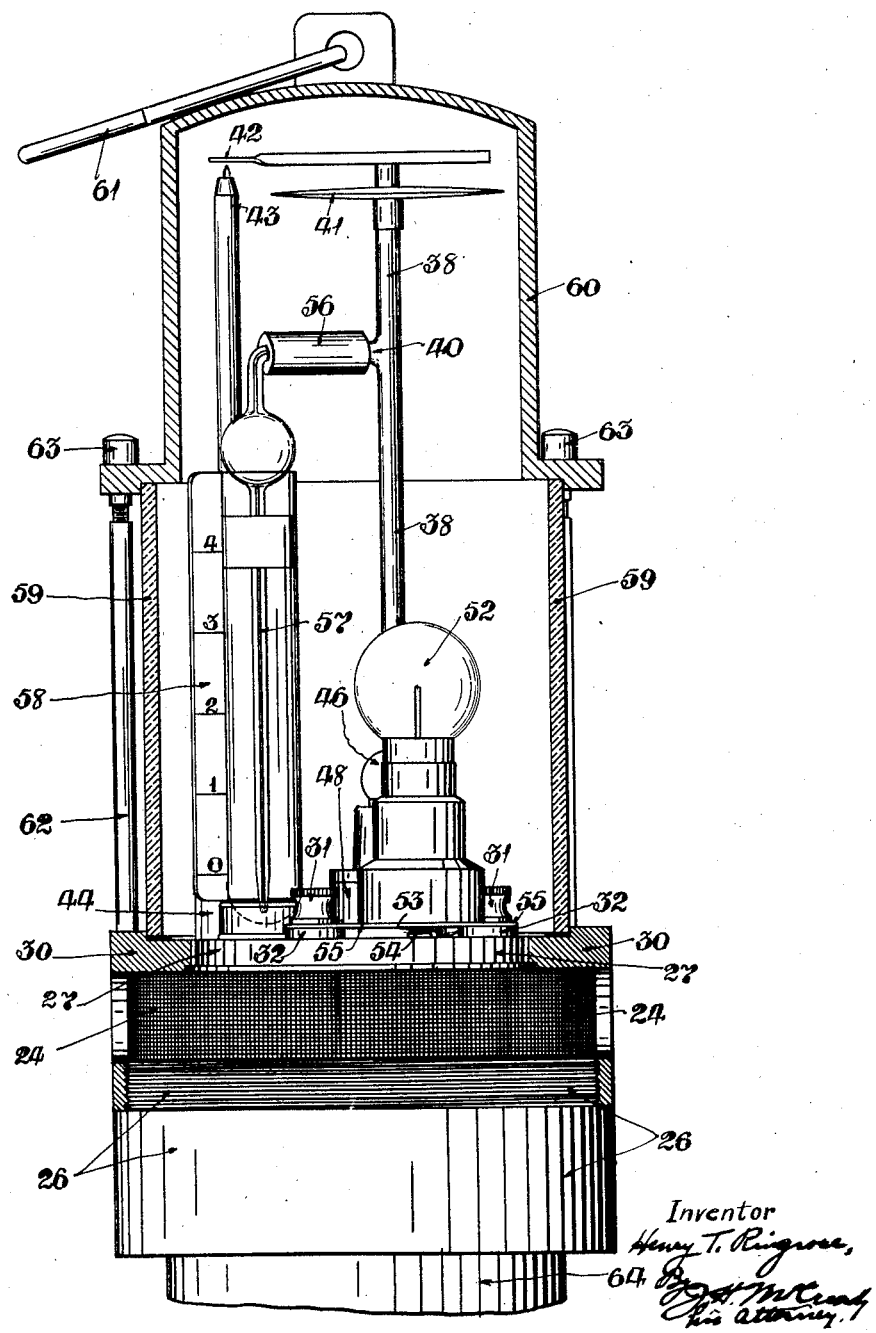

Oct. 11, 1927.  1,645,404
H. T. RINGROSE
DETECTING, INDICATING, AND RECORDING THE PRESENCE OF
INFLAMMABLE VAPORS OR GASES
Filed April 6, 1927  5 Sheets-Sheet 4

Inventor
Henry T. Ringrose.
By
his attorney.

Oct. 11, 1927.                                                    1,645,404
H. T. RINGROSE
DETECTING, INDICATING, AND RECORDING THE PRESENCE OF
INFLAMMABLE VAPORS OR GASES
Filed April 6, 1927          5 Sheets-Sheet 5

INVENTOR
HENRY T. RINGROSE
By J. H. McCready
ATTORNEY

Patented Oct. 11, 1927.

1,645,404

UNITED STATES PATENT OFFICE.

HENRY THOMAS RINGROSE, OF NEWARK-ON-TRENT, ENGLAND.

DETECTING, INDICATING, AND RECORDING THE PRESENCE OF INFLAMMABLE VAPORS OR GASES.

REISSUED

Application filed April 6, 1927, Serial No. 181,414, and in Great Britain September 28, 1925.

This invention relates to detecting, indicating and recording the presence of inflammable vapors or gases in mines and other places and has for its chief object more particularly to enable the indication and recording of marsh gas in the atmosphere of mines. A further object is to enable audible and visible signals to be given when the inflammable gas or vapor reaches predetermined amounts.

It has been previously proposed to measure marsh gas by allowing the gas to be tested to diffuse into a porous vessel and by absorbing the $CO_2$ produced after combustion in the vessel, the measurement depending on the resultant decrease in pressure, but the present invention necessitates no absorbent and thereby enables the readings of the machine to be independent of the presence of $CO_2$ or other absorbable vapors surrounding the vessel, and requires no renewals of absorbent charges. In other prior arrangements, the gas to be tested has been aspirated into a combustion chamber, in some cases through a filter, the decrease in pressure or volume due to combustion without any absorption of $CO_2$ or the like giving the indication.

According to the invention I provide an instrument or apparatus wherein a vacuum proportional to the amount of inflammable vapors or gases surrounding a porous vessel capable of maintaining a gas pressure for a substantial time is created in said vessel by combustion of the inflammable vapors or gases which diffuse through or are aspirated to said vessel, and in which the vacuum so produced is utilized to operate an indicator or recorder. In an embodiment of the invention the apparatus may consist of two porous vessels the open ends of which may be sealed or made air-tight by means of two caps. One of the porous vessels may be totally enclosed to prevent any inflammable gas or vapor reaching the interior, whilst the other porous vessel may be exposed to the inflammable gas or vapor in such a way that by the process of diffusion through the porous vessel, the inflammable gas reaches the interior where it is burnt, for example in the case of marsh gas according to the equation $CH_4 + 2O_2 = CO_2 + 2H_2O$, a vacuum proportional to the amount of inflammable gas surrounding the porous vessel being produced owing to the condensation of the water vapor. This vacuum may be used to operate an indicator or recorder working in conjunction with a chart showing the percentage of marsh gas and provision may be made to give visible or audible signals when the percentage reaches a predetermined quantity.

One method of creating the combustion may be to utilize inside or with the porous vessels platinum wire or its equivalent with or without a catalytic mass of platinum black or the like heated by an electric current. The second porous vessel (arranged so as to be protected from exposure to the inflammable gas as already indicated) may also have a hot platinum wire or equivalent in its interior or associated therewith exactly similar to that of the porous vessel exposed to the inflammable gas, there being, however, no combustion in the latter vessel owing to the absence of the inflammable gas, this porous vessel and hot wire serving to compensate for the expansion of vapor or gas which occurs immediately the wire is made hot in the other porous vessel. By this arrangement no difference in pressure exists between the interiors of the two respective porous vessels under ordinary circumstances but immediately any inflammable gas reaches or passes into the interior of one of them the difference in pressure operates the indicator or recorder owing to the combustion of the inflammable gas with consequent reduction in volume. The second porous vessel ensures the reading of the indicator or recorder to be independent of fluctuations of atmosphere, pressure and temperature. The condensed water collecting at the bottom of the porous chamber in which combustion occurs may be drawn off by a tap or trap without disturbing the vacuum produced. Whilst preferring the employment of the two vessels above referred to, in some cases one vessel only may be employed and in this connection the term vessel includes any appropriate device or member adapted to enable gases or vapors to be passed into the vicinity of or contact with a heated element for determining the inflammability of the atmosphere surrounding the instrument or apparatus.

Instead of relying on diffusion of the inflammable gas to the porous vessel, it may be expedient to aspirate the gas to the porous vessel by means of an aspirator. Such appliances may be fixed at various positions in a coal mine for the purpose of giving an indication or record of the percentage of marsh gas present. They may also be used on board ships or in other situations for indicating the presence of oil vapor.

In the process of combustion on the platinum wire or its equivalent the water produced ensures the atmosphere in the porous vessel exposed to the inflammable vapors or gases being saturated. It may be desirable to ensure a similar condition being existent in the other porous vessel not exposed to the inflammable gases in regard to water vapor, and water may have to be added artificially either to one or both porous vessels. One method of doing this would be to utilize water vapor given off from a wick or its equivalent, part of which is immersed in water contained in a suitable receptacle and the whole placed in direct air tight communication with the interior of the porous vessel or vessels.

As applied to an instrument embodying two porous vessels, both vessels may be exposed to the inflammable vapor by utilizing in each of the vessels a platinum wire or its equivalent giving the equivalent amount of heat. For this purpose the wire in the second vessel may be enclosed in a bulb or its equivalent so as to seal it from the air and the bulb adapted to plug in or connect with appropriate terminals. Alternatively the wire in the second vessel may be exposed and be of such dimensions that its temperature is below the ignition point of the gases surrounding it. With either of these arrangements a more accurate, sensitive or responsive reading or record of the inflammability of the atmosphere surrounding the instrument or apparatus can be obtained.

Figures 1 and 2 of the accompanying drawings illustrate in sectional side elevation and plan respectively an example of an apparatus for use in detecting the presence of inflammable gases according to the invention, only one of the porous vessel units being shown.

Figures 3 and 4 illustrate in plan and sectional side elevation respectively an embodiment of the invention in combination with an electric warning lamp adapted to be illuminated when the percentage of marsh gas reaches a predetermined quantity.

Figures 5, 6 and 7 illustrate in part sectional side elevation, plan and vertical section respectively an embodiment of the invention in combination with a miners' electric lamp, the arrangement being such as to give a visible indication on a manometer of the percentage of marsh gas and, when such percentage reaches a predetermined amount, to illuminate a warning lamp.

Figure 1:
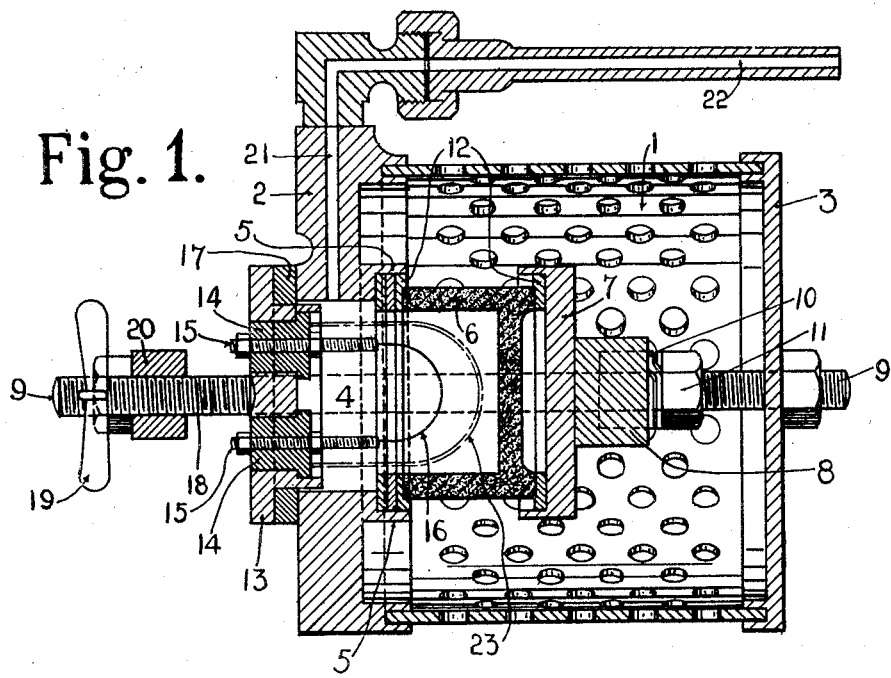
Figure 2:
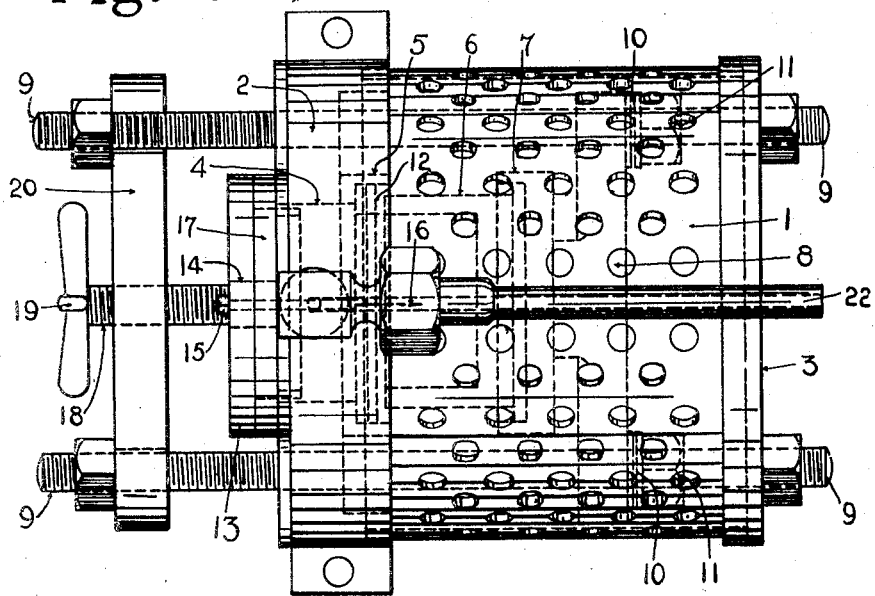

Referring to Figures 1 and 2 of the drawings, the apparatus comprises a perforated cylinder 1 carried between flanged end walls 2, 3, the end wall 2 being provided with a centrally disposed through opening or aperture 4 surrounded by an inwardly projecting flange 5 adapted to form a seating for one end of the porous vessel 6 which is secured in position within the perforated cylinder 1 by means of a flanged cap 7 and a clamping bar 8 mounted on screwed rods 9 passing through the cylinder 1, said clamping bar being held in position by means of spring washers 10 and nuts 11 mounted on said rods 9. Rubber or other packing rings 12 are located between the opposite ends of the porous vessel 6 and the cap 7 and seating flange 5 for ensuring tight joints between the parts. The through aperture or opening in the end wall 2 is closed by a removably mounted cover plate 13 provided with insulated bushes 14 carrying the terminals 15 of a platinum wire or filament 16 which projects into the porous vessel 6. A rubber or other packing ring 17 is placed between the wall 2 and the cover plate 13, and the latter is removably secured in position by means of a screw 18 having a winged head 19 and being passed through a cross-member or bar 20 carried between the adjacent ends of the screwed rods 9.

Figure 8:
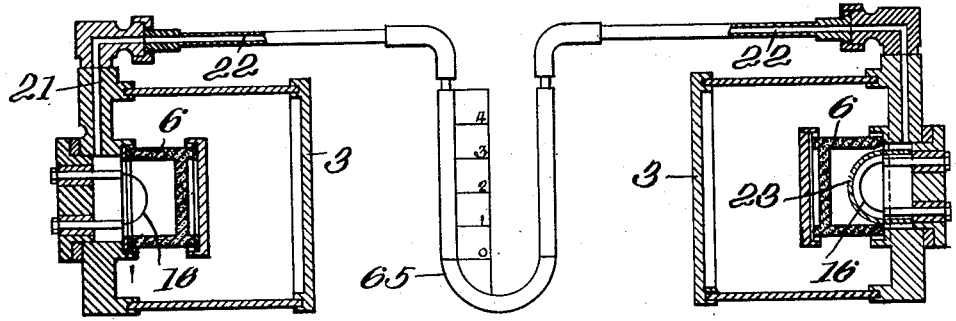
Fig. 8 illustrates an elevation, partially in section, of an embodiment of the invention in which two separate porous vessel units are disclosed, the units being connected by a manometer.

The end wall 2 is formed with a passage 21 communicating with the interior of the porous vessel 6 and leading by way of a pipe 22 to one limb of a manometer U-tube 65, Fig. 8 or other pressure indicator or recorder. A recorder gives an indication as well as making a record so that an indicator and a recorder are equivalents so far as this invention is concerned.

The other limb of the U-tube is connected to a porous vessel unit similar to the above, with the exception that the platinum wire or filament 16 is enclosed in a bulb or its equivalent 23, Fig. 8 and also as shown in dotted lines at Figure 1 of the drawings, so as to seal it from the surrounding air and gases which diffuse through the porous vessel 1.

Figure 9:
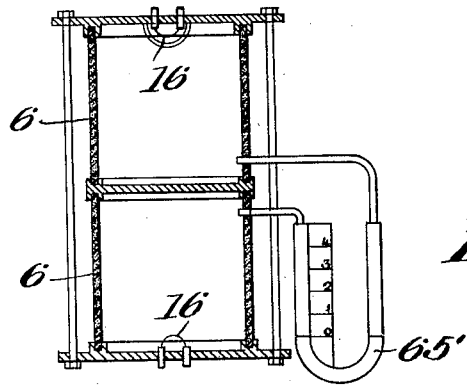
Fig. 9 illustrates an elevation, partially in section, of an embodiment similar to Fig. 8 in which the two units are formed in a single structure.

Instead of employing two separate porous vessel units as above described, two porous vessels may be built into a single portable unit by arranging them end to end with a partition or diaphragm between, as shown in Fig. 9, each outer end of the porous vessels being provided with a closing cover plate carrying the platinum wire or filament projecting into the adjacent porous vessel. The indicator or recorder 65' may be mounted on the side of the double unit, and the cover plates may be connected together by threaded rods and nuts for holding the parts together.

Referring to Figures 3 and 4 of the drawings, the apparatus comprises an annular gauze casing 24 containing glass wool 25 through which the gases pass to the porous vessel 6 clamped between a base member 26, forming the lid of a battery container (not shown) and an upper plate 27 by means of binding posts 28 which are screwed into the member 26 and pass through insulating bushes 29 in the plate 27. The gauze casing 24 is secured in position by an annular ring member 30 screwing on to the member 26, while the binding posts 28 are fitted at their upper ends with screw-on terminal heads 31 insulated from the plate 27 by ebonite or other insulating washers 32. Screwing into the member 26 is a metal disc member 33 carrying on its underside an ebonite or other insulating disc 34 fitted with contact segments 35 for engaging the battery terminals (not shown), while secured to the contact segments 35 and passing through the insulating disc 34 and the disc member 33 are terminals 15 which project into the porous vessel 6 and carry between them a platinum wire or other filament 16, one of said terminals 15 being insulated by an ebonite or other insulating sleeve 36 from the disc member 33. The insulated terminal 15 is provided at its upper end with a spring-pressed plunger 37 which contacts with the end of a vertical tube 38 sealed at its upper end by a cap 39 and having a right-angular branch 40 fitted with a collapsible diaphragm 41, said tube 38 being in communication with the interior of the porous vessel 6. The outer side of the diaphragm 41 carries a contact 42 in the form of an adjusting screw adapted, when the diaphragm collapses, to contact with a contact 43 mounted on an insulating block 44 on the plate 27. The contact 43 is connected by an insulated wire 45 to one filament contact of the lamp 46 and the other filament contact of the latter is connected by an insulated wire 47 to one of the binding posts 28. In use the inflammable gases which diffuse into the porous vessel 6 are burnt by coming into the vicinity of or contact with the heated platinum filament 16, thereby producing in said vessel 6 and its communicating tubes 38, 40 and diaphragm 41 a vacuum proportional to the amount of inflammable gases burnt, said diaphragm 41 collapsing owing to the difference in the pressures on the inside and the outside thereof. By appropriately positioning the adjustable contact 42 the collapsing of the diaphragm 41 may be caused to complete the circuit of the lamp 46 through the contacts 42, 43 when the percentage of inflammable gas or degree of vacuum reaches any predetermined quantity or point. The lamp 46 is mounted on an insulating block 48, and the plate 27 is formed with an opening 49 fitted with a transparent cover 50 which is held in place and sealed by a screw-threaded ferrule or sleeve 51, said opening 49 and transparent cover 50 permitting of the ready inspection of the filament 16.

Figure 6:
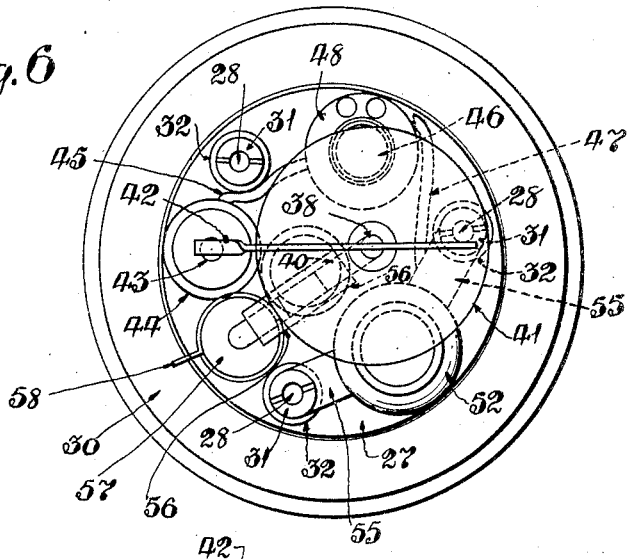
Figure 7:
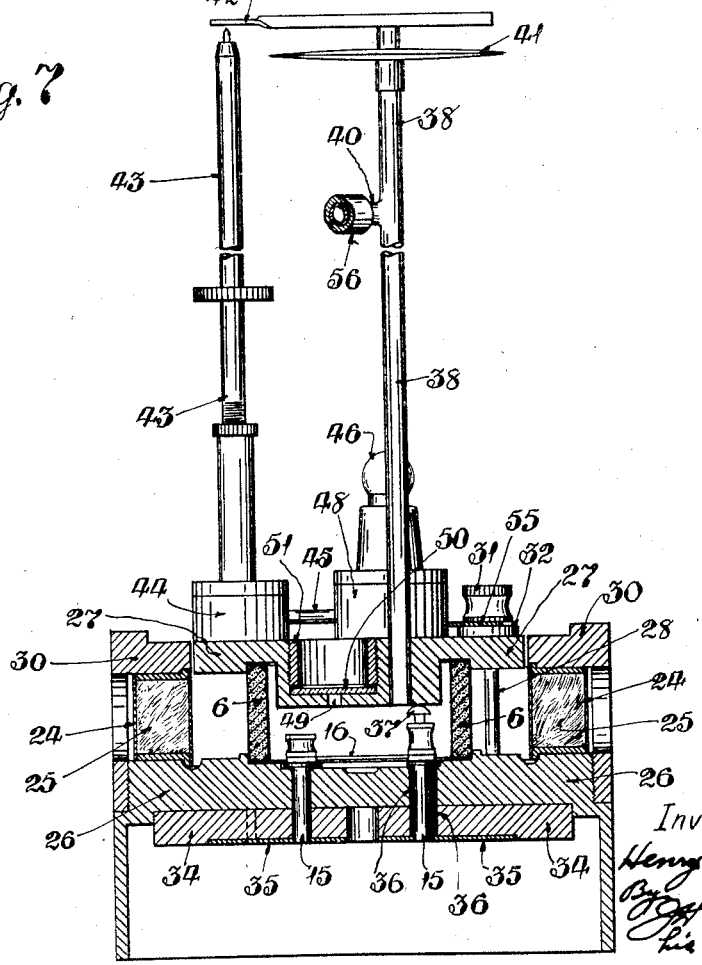

Referring to Figures 5, 6 and 7 wherein like reference numerals to those in Figures 3 and 4 indicate like or analogous parts, the diaphragm 41 is carried at the upper end of the vertical tube 38 and the contact 43 is in the form of an extensible rod, while the contact 42 is fixed to the diaphragm 41. The wire 47 from the warming lamp 46 is connected to one of the filament contacts of an electric lamp 52, such filament contact being connected to the appropriate segment 35 by a wire 53 passing through an insulating tube 54, while the other filament contact of the lamp 52 is connected by arms 55 to two of the binding posts 28. The lamp 52 affords the light by which the miner works. The branch 40 is connected by a rubber sleeve 56 to a manometer 57 fitted with a graduated scale 58 for enabling a reading of the percentage of inflammable gases to be readily taken. The apparatus above the plate 27 is enclosed within a lamp glass 59 and top cover or cap 60, the latter being provided with a carrying handle 61 and connected to the ring member 30 by screwed pillars 62 and nuts 63. A battery container 64 fits into the base member 26.

Figure 10:
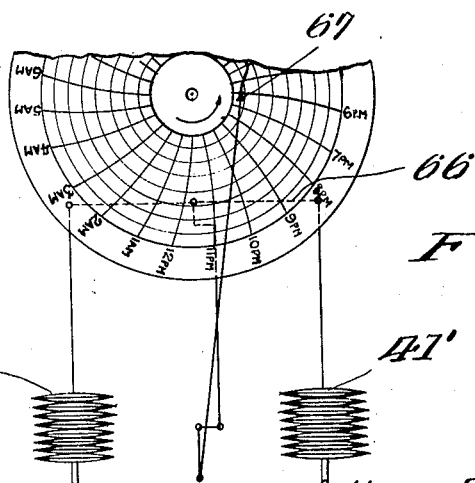
Fig. 10 is a plan view of a specific form of recording or indicating mechanism which is adapted for use with any of the porous vessel units, showing actuating diaphragms for the indicator.

Referring to Fig. 10 a recorder or indicating mechanism is illustrated in which a pair of multiple diaphragms 41' are utilized, these diaphragms being designed for connection to the porous units of the gas detector in a manner similar to the manometer 65. These diaphragms are pivotally connected to a balance lever 66 which is connected through links and levers to a pen 67.

It will be obvious that the created vacuum in one of the porous units will cause the multiple diaphragm connected thereto, for example, the left hand diaphragm of Fig. 10, to collapse so as to pull down the associated connecting rod and partially rotate the balance lever 66 and the top rack shaft in an anti-clockwise direction. This rotation of the top rock shaft swings the depending crank to the left and through the medium of the link and crank on the pen rock shaft to partially rotate the latter in a clockwise direction and move the pen 67. The movement of the pen is proportioned to and varies with the degree of vacuum. The chart is rotated in an anti-clockwise direction by a clock movement so that a continuous record or graph is produced on the chart. This operation is very similar to that disclosed in Figs. 3 to 7, in which the diaphragm 41 is collapsed to operate an electric recording or indicating mechanism.

I claim:—

1. In an apparatus for detecting the presence of combustible gas, the combination of a porous vessel, means in said vessel for causing combustible gas entering the vessel to be burned gradually therein, and indicating means arranged to be operated by the change in gaseous pressure created in said vessel by the combustion of said gas.

2. In an apparatus for detecting the presence of combustible gas, the combination of a porous vessel, means in said vessel for causing combustible gas entering the vessel to be burned gradually therein, and means for indicating variations in pressure created in said vessel by such combustion.

3. In an apparatus for detecting the presence of combustible gas, the combination of a porous vessel, a catalytic element in said vessel operative to promote combustion of inflammable gases entering said vessel, and indicating means arranged to be operated by the drop in gaseous pressure created in said vessel by such combustion.

4. In an apparatus for detecting the presence of combustible gas, the combination of a porous vessel, a catalytic element in said vessel operative to promote combustion of inflammable gases entering said vessel, an electrical circuit in which said element is included serving to maintain said element in an active condition, and indicating means arranged to be operated by the change in gaseous pressure created in said vessel by such combustion.

5. In an apparatus for detecting the presence of combustible gas, the combination of a porous vessel, a catalytic element in said vessel operative to promote combustion of inflammable gases entering said vessel, an electrical circuit in which said element is included serving to maintain said element in an active condition, and a manometer operatively connected with said vessel.

6. In an apparatus for detecting the presence of combustible gas, the combination of a porous vessel, a catalytic element in said vessel operative to promote combustion of inflammable gases entering said vessel, an electrical circuit in which said element is included serving to maintain said element in an active condition, an electric signal circuit, and controlling means therefor arranged to be operated by the change in pressure created in said vessel by such combustion.

7. In an apparatus for detecting the presence of combustible gas, the combination of a porous vessel, a catalytic element in said vessel operative to promote combustion of inflammable gases entering said vessel, an electrical circuit in which said element is included serving to maintain said element in an active condition, a second vessel exposed to said gas and having a catalytic element therein included in said circuit but inoperative to cause combustion of the gas in said second vessel, and means connected with said vessels for indicating the differences in gaseous pressure in them.

8. In an apparatus for detecting the presence of combustible gas, the combination of a substantially closed vessel affording a restricted admission of gas thereto under atmospheric pressure, and means in said vessel for causing combustible gas entering the same to be gradually burned therein.

9. In an apparatus for detecting the presence of combustible gas, the combination of a substantially closed vessel affording a restricted admission of gas thereto, means in said vessel for causing combustible gas entering the same to be gradually burned therein, a diaphragm connected with said vessel and arranged to be moved by changes in the gaseous pressure created in the vessel by said combustion of gas therein, and an electric circuit including circuit opening and closing members arranged to be relatively operated by said diaphragm.

10. In an apparatus for detecting the presence of combustible gas, the combination of a subtantially closed vessel affording a restricted, continuous admission of gas thereto, and means in said vessel for causing combustible gas entering the same to be continuously burned therein.

11. In an apparatus for detecting the presence of combustible gas, the combination of a substantially closed vessel affording a restricted admission of gas thereto, means in said vessel for causing said combustible gas entering the same to be gradually burned therein, means connected with said vessel and arranged for actuation by changes in the gaseous pressure created in the vessel by said combustion of gas therein, and an indicating means connected to said first means for actuation thereby.

12. In an apparatus for detecting the presence of combustible gas, the combination of a substantially closed vessel affording a restricted admission of gas thereto, means in said vessel for causing said combustible gas entering the same to be gradually burned therein, means connected with said vessel and arranged for actuation by changes in the gaseous pressure created in the vessel by said combustion of gas therein, and additional means arranged to be operated by said first named means for indicating the presence and relative quantity of combustible gases.

13. In an apparatus for detecting the presence of combustible gas, the combination of a substantially closed vessel affording a restricted but continuous admission of gas thereto, means in said vessel for causing the gas to be burned gradually therein, and continuously operating indicating means arranged to be actuated by the changes in gaseous pressure created in said vessel by the combustion of said gas.

14. In an apparatus for detecting the presence of combustible gas, the combination of a porous vessel, means in said vessel for causing combustible gas entering the vessel to be burned gradually therein, a collapsible diaphragm mounted on said vessel and having its interior in communication with the interior of said vessel whereby changes of pressure in said vessel due to burning of the gases will be transmitted to the interior of said diaphragm, and means for indicating variations in pressure created in said vessel, said means being arranged to be actuated by movements of said diaphragm.

In testimony whereof I have signed the foregoing specification.

HENRY THOMAS RINGROSE.